United States Patent Office 3,563,772
Patented Feb. 16, 1971

3,563,772
ENVELOPE FOR A SODIUM VAPOR DISCHARGE LAMP
Hendrik Jacobus Maria Joormann and Gustaaf Adolf Wesselink, Emmasingel, Eindhoven, Netherlands, assignors, by mesne assignments, to U.S. Philips Corporation, New York, N.Y., a corporation of Delaware
No Drawing. Filed Dec. 28, 1967, Ser. No. 694,099
Claims priority, application Netherlands, Dec. 29, 1966, 6618308; Aug. 4, 1967, 6710744
Int. Cl. C03c *3/04, 3/08, 3/30*
U.S. Cl. 106—52                                5 Claims

ABSTRACT OF THE DISCLOSURE

An envelope for a sodium vapor lamp consists of a glass resistant to attack by sodium vapor which is an alkaline earth silicate in which $Al_2O_3$ is present, namely a small range of compositions in the system $$RO—Al_2O_3—SiO_2$$

Borate glasses which are resistant to the action of alkali vapour and are particularly used as an envelope for a sodium vapour discharge lamp have been known for a long time. Most of these types of glass are not very resistant to atmospheric attack with the result that they require a substrate glass on the inner side of which they are used. The manufacture of such an envelope therefore requires highly qualified professional skill. A plurality of these known glasses devitrify rather easily. In addition most of them have a low softening point and show a resistance to the action of alkali vapour only to a rather low temperature, that is to say, to, for example 350° C.

It is also generally known from experience that the presence of $SiO_2$ in borate glasses for the above-mentioned use is prohibitive because as a result thereof an intensive brown or black discolouration occurs already at very short contact with alkali vapour.

A class of boro-silicate glasses which do not discolour upon the above mentioned contact is, however, also known, and in connection therewith these glasses were suggested as envelope materials for a sodium vapour discharge lamp. They have a higher softening point than the average borate glasses and are resistant to the action of sodium vapour to a slightly higher temperature. These glasses are, however, not interesting for practical use because their chemical resistance is insufficient and hence the glass would have to be used again in combinatoin with a substrate glass.

The invention provides a class of glasses which are resistant to the action of sodium vapour to approximately 600°, are chemically sufficiently resistant to be used as a self-supporting construction and which can readily be melted in a flame of natural gas without devitrification occurring.

The invention is based on the discovery that silicate glasses do not show discolouration if the $SiO_4$ tetrahedrons are not linked by bridge oxygen atoms but are isolated in the glass network. It was found that this is the case with a group of alkaline earth silicates in which also $Al_2O_3$ is present, namely a small range of compositions in the system of $RO—Al_2O_3—SiO_2$ which is situated near the composition gehlenite ($2CaO.Al_2O_3.SiO_2$).

According to the invention the glass which contains $SiO_2$, $Al_2O_3$ and alkaline earth oxide is characterized in that it has a composition in mol. percent between the following limits:

| | |
|---|---|
| $SiO_2$ | 14–43 |
| $B_2O_3$ | 0–10 |
| $Al_2O_3$ | 9–37 |
| CaO | 15–61 |
| BaO | 0–35 |
| BeO | 0–24 |
| MgO | 0–24 |
| $Li_2O+Na_2O$ | 0–27.5 | in which the total of $$CaO+BaO+BeO+MgO+Li_2O+Na_2O$$

amounts 38–36.

In this range of glasses there are those which have to be melted at rather high temperature in order to obtain a product which does not devitrify. For practical considerations those glasses are preferred which can be melted at a temperature between 1500° C. and 1600° C. without any crystallization occurring during cooling. The preferred range of compositions within which the glasses meet this requirement is the following:

| | |
|---|---|
| $SiO_2$ | 27.5–40 |
| $B_2O_3$ | 0–10 |
| $Al_2O_3$ | 10–30 |
| CaO | 15–35 |
| BaO | 15–30 |
| MgO | 0–24 |
| BeO | 0–24 |
| $Na_2O$ | 0–15 |
| $Li_2O+Na_2O$ | 0–17.5 | in which the total of $$CaO+BaO+BeO+MgO+Li_2O+Na_2O$$

amounts to 42–52.5.

Slightly coloured glasses are also within this preferred range of compositions so that they are, however, still excellently usable. Only colourless glasses are in the following further preferred range of compositions in mol. percent.

| | |
|---|---|
| $SiO_2$ | 27.5–40 |
| $B_2O_3$ | 0–10 |
| $Al_2O_3$ | 15–30 |
| CaO | 15–24 |
| BaO | 15–24 |
| MgO | 0–24 |
| BeO | 0–24 |
| $Na_2O$ | 0–15 |
| $Li_2O+Na_2O$ | 0–17.5 | in which the total of $$CaO+BaO+BeO+MgO+Li_2O+Na_2O$$

amounts to 42–52.5.

The processability of the glasses can further be improved and the risk of crystallisation further be suppressed if the content of $B_2O_3$ is chosen as indicated in the following range:

| | |
|---|---:|
| $SiO_2$ | 27.5–40 |
| $B_2O_3$ | 1–5 |
| $Al_2O_3$ | 15–30 |
| CaO | 15–24 |
| BaO | 15–24 |
| MgO | 0–24 |
| BeO | 0–24 |
| $Na_2O$ | 0–15 |
| $Li_2O+Na_2O$ | 0–17.5 |

The glasses according to the invention have a strain point of approximately 800° C. which is the temperature at which the viscosity is $1^{13.4}$ poises.

The following glasses mentioned by way of example were prepared by melting a mixture of quartz sand, aluminium oxide and calcium carbonate, and if desired barium carbonate, strontium carbonate, lithium carbonate, beryllium carbonate and boric acid at a temperature of approximately between 1690° C. and 1800° C. and 1400° C. and 1600° C. respectively. The composition of the glasses obtained after cooling are shown in the following Tables I, II and III, respectively.

consisting of a glass consisting essentially of a composition in mol. percent between the following limits:

| | |
|---|---:|
| $SiO_2$ | 14–43 |
| $B_2O_3$ | 0–10 |
| $Al_2O_3$ | 9–37 |
| CaO | 15–61 |
| BaO | 0–35 |
| BeO | 0–24 |
| MgO | 0–24 |
| $Li_2O+Na_2O$ | 0–27.5 | in which the total of $$CaO+BaO+BeO+MgO+Li_2O+Na_2O$$

amounts to 38–61.

2. An envelope as claimed in claim 1, wherein the glass has a composition in mol. percent between the following limits:

| | |
|---|---:|
| $SiO_2$ | 27.5–40 |
| $B_2O_3$ | 0–10 |
| $Al_2O_3$ | 10–30 |
| CaO | 15–35 |
| BaO | 15–30 |
| BeO | 0–24 |
| MgO | 0–24 |
| $Na_2O$ | 0–15 |
| $Li_2O+Na_2O$ | 0–17.5 |

TABLE I

| Number | Composition, molecular percent | | | | | | | Composition in percent by weight | | | | | | |
|---|---|---|---|---|---|---|---|---|---|---|---|---|---|---|
| | $SiO_2$ | $Al_2O_3$ | CaO | BaO | MgO | $Li_2O$ | $Na_2O$ | $SiO_2$ | $Al_2O_3$ | CaO | BaO | MgO | $Li_2O$ | $Na_2$ |
| 1 | 40 | 20 | 40 | | | | | 36.0 | 30.5 | 33.5 | | | | |
| 2 | 40 | 20 | 20 | | 20 | | | 37.7 | 32.1 | 17.6 | | 12.6 | | |
| 3 | 40 | 20 | 13.4 | 13.3 | 13.3 | | | 30.9 | 26.3 | 9.6 | 26.3 | 6.9 | | |
| 4 | 40 | 20 | 20 | 20 | | | | 27.8 | 23.7 | 13.0 | 35.5 | | | |
| 5 | 40 | 10 | 50 | | | | | 38.6 | 16.4 | 45.0 | | | | |
| 6 | 30 | 30 | 40 | | | | | 25.3 | 43.1 | 31.6 | | | | |
| 7 | 25 | 25 | 50 | | | | | 21.9 | 37.2 | 40.9 | | | | |
| 8 | 25 | 25 | 16.7 | 33.3 | | | | 14.9 | 25.3 | 9.2 | 50.6 | | | |
| 9 | 25 | 25 | 16.7 | 16.7 | 16.7 | | | 18.3 | 31.1 | 11.4 | 31.1 | 8.1 | | |
| 10 | 30 | 15 | 55 | | | | | 28.1 | 23.9 | 48.0 | | | | |
| 11 | 15 | 25 | 60 | | | | | 13.2 | 37.4 | 49.4 | | | | |
| 12 | 15 | 35 | 50 | | | | | 12.4 | 49.1 | 38.5 | | | | |
| 13 | 40 | 10 | 25 | 25 | | | | 27.8 | 11.7 | 16.2 | 44.3 | | | |
| 14 | 30 | 15 | 27.5 | 27.5 | | | | 19.9 | 17.9 | 16.9 | 46.3 | | | |
| 15 | 33.3 | 16.7 | 50 | | | | | 30.7 | 26.2 | 43.1 | | | | |

TABLE II

| Number | Composition in molecular percent | | | | | | | Composition in percent by weight | | | | | | | Colour |
|---|---|---|---|---|---|---|---|---|---|---|---|---|---|---|---|
| | $SiO_2$ | $Al_2O_3$ | CaO | BaO | MgO | $Li_2O$ | $Na_2O$ | $SiO_2$ | $Al_2O_3$ | CaO | BaO | MgO | $Li_2O$ | $Na_2O$ | |
| 16 | 33.3 | 16.7 | 33.3 | 16.7 | | | | 24.6 | 20.9 | 23.0 | 31.5 | | | | Light brown. |
| 17 | 33.3 | 16.7 | 25 | 25 | | | | 22.4 | 19.1 | 15.7 | 42.8 | | | | Do. |
| 18 | 37 | 13 | 25 | 25 | | | | 25.3 | 15.1 | 16.0 | 43.6 | | | | Do. |
| 19 | 35 | 20 | 22.5 | 22.5 | | | | 23.8 | 23.1 | 14.2 | 38.9 | | | | Colourless. |
| 20 | 38 | 16 | 23 | 23 | | | | 26.2 | 18.7 | 14.8 | 40.3 | | | | Do. |
| 21 | 30 | 25 | 22.5 | 22.5 | | | | 19.9 | 28.2 | 13.8 | 38.1 | | | | Do. |
| 22 | 35 | 20 | 17.5 | 17.5 | | 10 | | 25.9 | 25.2 | 12.1 | 33.1 | | 3.7 | | Do. |
| 23 | 35 | 20 | 20 | 20 | | | 5 | 24.3 | 23.7 | 12.9 | 35.5 | | | 3.6 | Do. |
| 24 | 35 | 20 | 17.5 | 17.5 | | | 10 | 24.9 | 24.2 | 11.7 | 31.8 | | | 7.4 | Do. |
| 25 | 33.3 | 16.7 | 16.6 | 16.7 | 16.7 | | | 25.4 | 21.7 | 11.9 | 32.5 | 8.5 | | | Do. |
| 26 | 35 | 20 | 11.7 | 23.3 | | 10 | | 24.2 | 23.6 | 7.5 | 41.2 | | 3.5 | | Light brown. |

TABLE III

| Number | Composition in molecular percent | | | | | | | | Composition in percent by weight | | | | | | | | Colour |
|---|---|---|---|---|---|---|---|---|---|---|---|---|---|---|---|---|---|
| | $SiO_2$ | $Al_2O_3$ | CaO | SrO | BaO | $Li_2O$ | BeO | $B_2O_3$ | $SiO_2$ | $Al_2O_3$ | CaO | SrO | BaO | $Li_2O$ | BeO | $B_2O_3$ | |
| 27 | 25 | 25 | 30 | | | 10 | 10 | | 24.0 | 40.5 | 26.7 | | | 4.8 | 4.0 | | Light yellow brown. |
| 28 | 35 | 20 | 10 | 7.5 | 10 | 10 | 7.5 | | 28.7 | 27.8 | 7.6 | 8.3 | 20.9 | 4.1 | 2.6 | | Light yellow. |
| 29 | 20 | 25 | 17.5 | 17.5 | 15 | | | 5.0 | 13.1 | 27.7 | 10.7 | 19.8 | 24.9 | | | 3.8 | Light green. |
| 30 | 32.5 | 20 | 12.5 | 10 | 12.5 | 10 | | 2.5 | 24.0 | 25.1 | 8.6 | 12.8 | 23.6 | 3.7 | | 2.2 | Light yellow green. |
| 31 | 27.5 | 20 | 17.5 | | 17.5 | 10 | | 7.5 | 20.2 | 25.0 | 12.0 | | 32.7 | 3.7 | | 6.4 | Very light yellow. |

Outside the range according to the invention there are no sodium resistant compositions which are obtainable in a vitreous state.

What is claimed is:

1. An envelope for a sodium vapour discharge lamp, in which the total of $$CaO+BaO+BeO+MgO+Li_2O+Na_2O$$

amounts to 42–52.5.

3. An envelope as claimed in claim 2, wherein the glass has a composition in mol. percent between the following limits:

| | |
|---|---|
| SiO$_2$ | 27.5–40 |
| B$_2$O$_3$ | 0–10 |
| Al$_2$O$_3$ | 15–30 |
| CaO | 15–24 |
| BaO | 15–24 |
| BeO | 0–24 |
| MgO | 0–24 |
| Na$_2$O | 0–15 |
| Li$_2$O+Na$_2$[+]O | 0–17.5 | in which the total of $$CaO+BaO+BeO+MgO+Li_2O+Na_2O$$

amounts to 42–52.5.

4. An envelope as claimed in claim 2, wherein the glass has a composition in mol. percent between the following limits:

| | |
|---|---|
| SiO$_2$ | 27.5–40 |
| Al$_2$O$_3$ | 15–30 |
| CaO | 15–24 |
| BaO | 15–24 |
| MgO | 0–24 |
| Na$_2$O | 0–15 |
| Li$_2$[O]±Na$_2$O | 0–17.5 | in which the total of $$CaO+BaO+MgO+Li_2O+Na_2O$$

amounts to 42–52.5.

5. An envelope as claimed in claim 3, wherein the glass has a composition in mol. percent between the following limits:

| | |
|---|---|
| SiO$_2$ | 27.5–40 |
| B$_2$O$_3$ | 1–5 |
| Al$_2$O$_3$ | 15–30 |
| CaO | 15–24 |
| BaO | 15–24 |
| BeO | 0–24 |
| MgO | 0–24 |
| Na$_2$O | 0–15 |
| Li$_2$O+Na$_2$O | 0–17.5 | in which the total of $$CaO+BaO+BeO+MgO+Li_2O+Na_2O$$

amounts to 42–52.5.

References Cited
UNITED STATES PATENTS

| | | | |
|---|---|---|---|
| 2,934,667 | 4/1960 | Pincus | 106—54X |
| 3,134,920 | 5/1964 | Van De Weijer et al. | 106—54X |
| 3,173,779 | 3/1965 | Navias | 106—54X |
| 3,338,694 | 8/1967 | Davy | 106—47UX |

OTHER REFERENCES

Imaoka: Advances in Glass Technology, Plenum Press, New York (1962), p. 154, "Glass-Formation Range and Glass Structure."

HELEN M. McCARTHY, Primary Examiner

U.S. Cl. X.R.

106—54; 313—112, 221

PO-1050
(5/69)

UNITED STATES PATENT OFFICE
CERTIFICATE OF CORRECTION

Patent No. 3,563,772                Dated  February 16, 1971

Inventor(s) HENDRIK J.M. JOORMANN and GUSTAAF A. WESSELINK

It is certified that error appears in the above-identified patent and that said Letters Patent are hereby corrected as shown below:

Column 1, line 49, change "combinatoin" to --combina

Column 2, line 20, change "38-36" to --38-61--;

SIGNED AND SEALED THIS       13th       DAY OF July, 1971.

(SEAL)
Attest:

EDWARD M.FLETCHER,JR.                 WILLIAM E. SCHUYLER, JR.
Attesting Officer                     Commissioner of Patents